J. BATTIN.

Coal Breaker.

No. 3,438.

Patented Feb. 12, 1844.

UNITED STATES PATENT OFFICE.

JOSEPH BATTIN, OF PHILADELPHIA, PENNSYLVANIA.

MACHINE FOR BREAKING COAL.

Specification forming part of Letters Patent No. 3,438, dated February 12, 1844; Reissued September 4, 1849, No. 142.

*To all whom it may concern:*

Be it known that I, JOSEPH BATTIN, of the city of Philadelphia, in the State of Pennsylvania, have made a new and useful Improvement in the Manner of Combining and Arranging the Toothed Rollers Used in Machines for Breaking Coal, which rollers as combined and arranged by me are described as follows in the specification attached to Letters Patent for a machine for effecting simultaneously the breaking and screening of coal granted to me under date of October 6, 1843.

"The breaking part of my machine consists of two rollers of cast-iron, the peripheries of which are provided with teeth so placed as that in the revolution of the rollers the teeth of each of them shall stand opposite to the spaces formed by two contiguous teeth on the opposite roller. These rollers are geared together in order to cause them to preserve the same relative positions."

In the above named Letters Patent, this manner of arranging and combining the toothed rollers was not made the subject of a claim, the said patent having been obtained for the combining of a roller breaking machine with a screen for separating the coal into the different sizes required; but as the breaking rollers, so formed, arranged, and combined, are applicable to the ordinary cylinder breaking machine when not used in combination with a screen, and as I have found by continued experiment, that such rollers constitute a real improvement in any breaking machine, I have determined to secure to myself the benefit of such improvement in a distinct and separate patent therefor.

Rollers for the breaking of stone, of ores, of coal, of corn, and of other substances, have been frequently constructed, and are well known. Some of these have been fluted, and others have been furnished with projecting teeth on their surfaces, but they have never, as I verily believe, been made to operate in the manner in which my improved rollers operate.

In the accompanying drawing, I have represented my improved rollers in section, unconnected with the frame work of the machine, this allowing their peculiar arrangement and combination to be most clearly shown, and I have also given a top view of the main breaking rollers.

Figure 1:
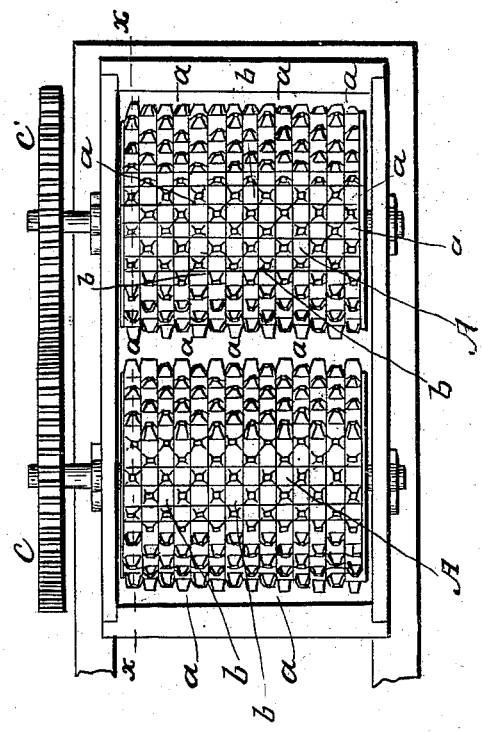
Figure 2:
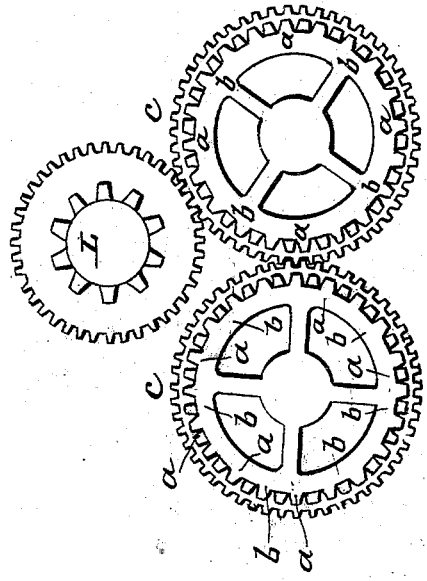

Figure 1, is a top view of the breaking rollers, A, A', having on their axes the toothed wheels C, C', which gear into each other, thus causing them to revolve together, and to preserve their relative positions. Fig. 2, is a vertical section of these rollers, in the line $x$, $x$, of Fig. 1. In this figure, I have also given a section of an additional, or auxiliary, roller, L, which I sometimes use for the purpose of reducing such large lumps of coal as might not be readily acted upon by the principal rollers and which is fully described in a patent obtained by me for an additional improvement on the machine as described by me in the patent of October, 1843, above referred to. On the main rollers, A, A', $a$, $a$, $a$, are the teeth which are made to extend around and along them in regular rows, leaving spaces, $b$, $b$, $b$, between them; were these rollers to be placed sufficiently near to each other, the teeth, $a$, $a$, $a$, on each of them would pass into the spaces $b$, $b$, $b$, on the opposite roller, and they would thus be geared together like a succession of toothed wheels placed on the same axes; the two cylinders, however, are, when used for breaking coal, usually placed at the distance of three, or four, inches, more or less, apart; but when so placed the relative positions of their respective teeth are to remain the same as though they actually meshed between each other, like the teeth of geared wheels; each of the teeth, $a$, $a$, being kept opposite to a space, $b$, $b$, when acting upon the coal to be broken; this, it will be readily seen, will be perfectly effected by means of the geared wheels, C, C', on the axes of the rollers. M, is a toothed wheel on the axis of the roller L, which, when used, is made to gear into one of the wheels, C, C'.

Having thus fully described the nature of my improvement in the manner of combining and arranging the toothed rollers used in the machine for breaking coal, what I claim therein as new, and desire to secure by Letters Patent, is—

The so forming and gearing of such rollers as that the teeth of one of them shall always be opposite to a space between the teeth in the other, whenever they are operating upon the article to be broken, the same being effected substantially in the manner herein set forth.

JOSEPH BATTIN.

Witnesses:
R. M. MAGILL,
GEORGE ERETY.

[FIRST PRINTED 1913.]